US008118269B2

(12) United States Patent
Ternus et al.

(10) Patent No.: US 8,118,269 B2
(45) Date of Patent: Feb. 21, 2012

(54) FLAT PANEL DISPLAY INCLUDING A HINGE ASSEMBLY

(75) Inventors: John Ternus, Palo Alto, CA (US); Eric Knopf, Mountain View, CA (US); Sean Corbin, Menlo Park, CA (US); Brett Degner, Menlo Park, CA (US); Daniele De Iuliis, San Francisco, CA (US); Shin Nishibori, San Francisco, CA (US); Amy Aimei Han, Palo Alto, CA (US); Michael David Hillman, Campbell, CA (US); Daniel Lynn McBroom, Leonard, TX (US); Michael David McBroom, Celeste, TX (US); Brian Thomas Sudderth, Leonard, TX (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 12/476,182

(22) Filed: Jun. 1, 2009

(65) Prior Publication Data
US 2009/0230270 A1    Sep. 17, 2009

Related U.S. Application Data

(63) Continuation of application No. 11/112,177, filed on Apr. 22, 2005, now abandoned.

(51) Int. Cl.
*F16L 3/00* (2006.01)
(52) U.S. Cl. ................ 248/121; 248/291.1; 248/923; 361/679.21

(58) Field of Classification Search ............ 248/121, 248/126, 923, 919, 291.1; 361/679.21, 679.27
See application file for complete search history.

(56) References Cited

U.S. PATENT DOCUMENTS

| 6,419,196 | B1 * | 7/2002 | Sweere et al. | 248/276.1 |
| 6,505,988 | B1 * | 1/2003 | Oddsen, Jr. | 403/110 |
| 6,688,572 | B2 * | 2/2004 | Huang et al. | 248/291.1 |
| 6,954,221 | B2 * | 10/2005 | Wu | 361/679.21 |
| D531,631 | S * | 11/2006 | Andre et al. | D14/375 |
| 7,237,755 | B2 * | 7/2007 | Cho et al. | 248/274.1 |
| 7,334,765 | B2 * | 2/2008 | Hwang | 248/284.1 |
| 7,338,019 | B2 * | 3/2008 | Liu et al. | 248/123.11 |
| 2002/0020792 | A1 * | 2/2002 | Lee | 248/278.1 |
| 2004/0084578 | A1 * | 5/2004 | Cho et al. | 248/125.1 |
| 2006/0001783 | A1 * | 1/2006 | Kato | 348/794 |
| 2006/0032998 | A1 * | 2/2006 | Depay | 248/291.1 |
| 2006/0076463 | A1 * | 4/2006 | Drew | 248/121 |
| 2006/0181637 | A1 * | 8/2006 | Oddsen et al. | 348/373 |

* cited by examiner

*Primary Examiner* — Terrell McKinnon
*Assistant Examiner* — Bradley Duckworth
(74) *Attorney, Agent, or Firm* — Fletcher Yoder PC (57) ABSTRACT

An apparatus for a flat panel is disclosed. The apparatus comprises a flat panel assembly and a hinge mechanism coupled to the flat panel assembly. The hinge mechanism is adaptable to an industry standard mount and a non-industry standard mount. A system and method in accordance with the present invention allows for the replacement of a non-VESA standard compatible display mount with a display mount that is compatible with the VESA standard. Utilizing the system and method in accordance with the present invention, such a replacement can be accomplished with minimal effort, and in an efficient manner.

16 Claims, 10 Drawing Sheets

FLAT PANEL DISPLAY INCLUDING A HINGE ASSEMBLY

CROSS-REFERENCE TO RELATED APPLICATIONS

Under 35 USC §120, this application is a continuation application and claims the benefit of priority to commonly-owned U.S. patent application Ser. No. 11/112,177, filed Apr. 22, 2005, entitled "Flat Panel Display Including A Hinge Assembly", all the contents of which are incorporated herein by reference.

FIELD OF THE INVENTION

The present invention relates generally to displays and more particularly to flat panel displays utilized within an integrated system environment.

BACKGROUND OF THE INVENTION

Flat panel displays have advanced to the point of being comparable with CRTs with respect to resolution, color capabilities and image quality. In most environments, flat panel displays are more desirable than CRTs due to their compact, portable size and low weight.

In an integrated computer system environment it is desirable to be able to mount and remove the display from an integrated computer system in an easy and convenient manner. In addition, due to the proliferation of different and incompatible flat panel display interfaces, it is difficult, costly and time consuming to integrate flat panel displays into notebook computers, instrumentation and other devices with integrated displays.

The Video Electronics Standards Association (VESA) has developed a flat panel display interface standard that standardizes mounting specifications. Accordingly, it is desirable that a flat panel display have a VESA compliant mounting system and also be able to be adapted to a non-VESA compliant mounting system.

Accordingly, what is desired is a flat panel display which can rotate in a variety of directions, be easily mounted in an integrated computer environment, and which is also VESA compliant yet able to be adapted to a non-VESA compliant mounting system. The flat panel display should be cost effective, easily adapted to existing integrated computer environments and be easily removed from and mounted in such an environment. The present invention addresses such a need.

SUMMARY OF THE INVENTION

An apparatus for a flat panel is disclosed. The apparatus comprises a flat panel assembly and a hinge mechanism coupled to the flat panel assembly. The hinge mechanism is adaptable to an industry standard mount and a non-industry standard mount.

A system and method in accordance with the present invention allows for the replacement of a non-VESA standard compatible display mount with a display mount that is compatible with the VESA standard. Utilizing the system and method in accordance with the present invention, such a replacement can be accomplished with minimal effort, and in an efficient manner.

DETAILED DESCRIPTION

The present invention relates generally to displays and more particularly to flat panel displays utilized within an integrated system environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
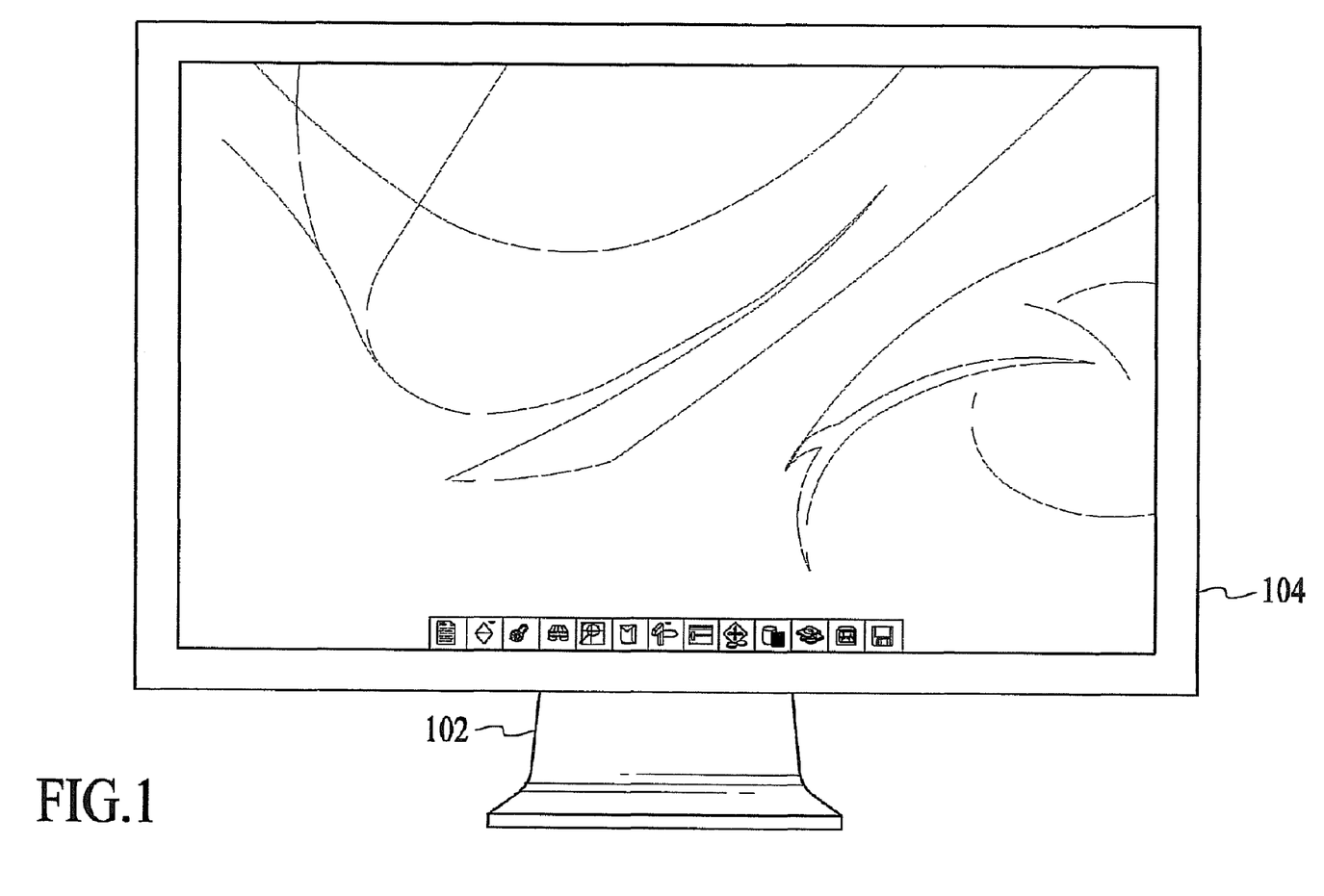
FIG. 1 illustrates a perspective front view of a first embodiment of the display mechanism which allows for replacing a display mount with a VESA-compliant display mount in accordance with the present invention.
Figure 2:
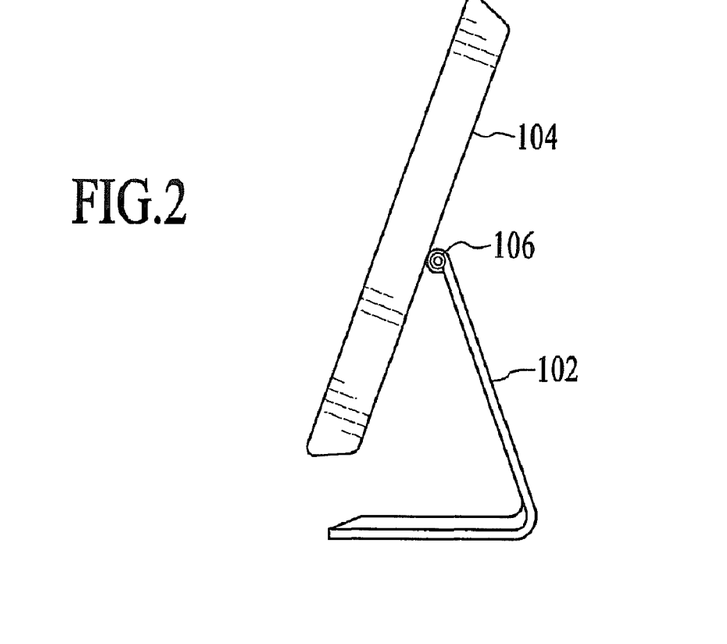
FIG. 2 illustrates a side view of the display and stand of FIG. 1 and the hinge mechanism.

FIG. 1 illustrates a perspective front view of a first embodiment of the display mechanism which allows for replacing a display mount with a VESA-compliant display mount in accordance with the present invention. In this first embodiment a stand 102 is coupled externally to the display 104 utilizing a hinge assembly (not shown). FIG. 2 illustrates a side view of the display 104 and stand 102 of FIG. 1 and the hinge mechanism 106.

Figure 3:
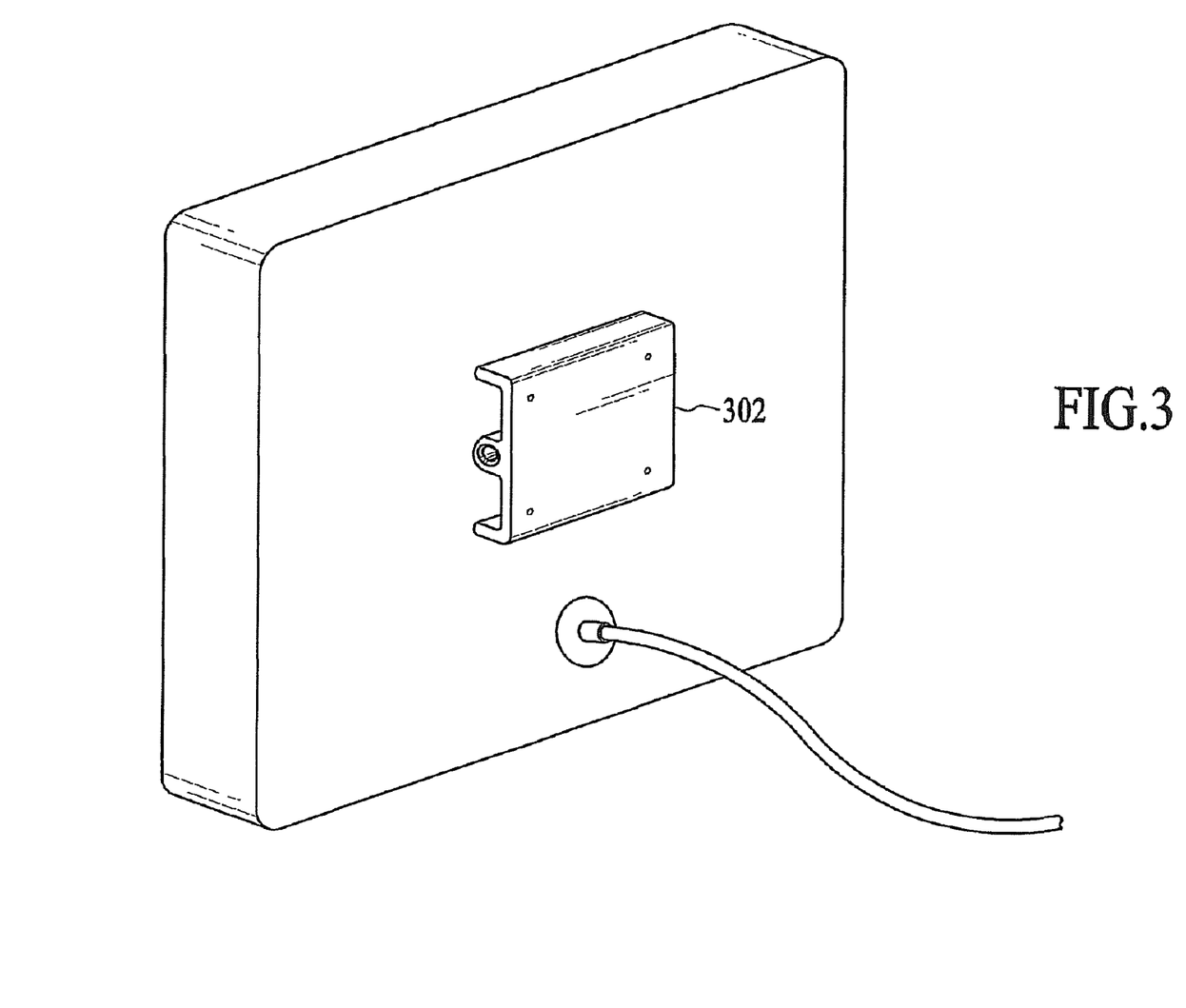
FIG. 3 illustrates a VESA-compliant display mount adapter attached to the back cover of a display in accordance with the present invention.

FIG. 3 illustrates a VESA-compliant display mount adapter 302 attached to the back cover of a display in accordance with the present invention.

A system and method in accordance with the present invention allows for mounting either a conventional display or an integrated computer display to either a VESA compliant mount or to a non-VESA compliant mount or stand.

Utilizing the system and method in accordance with the present invention, such a replacement can be accomplished with minimal effort, and in an efficient manner. The system and method can be implemented in a display wherein the attachment hinge mechanism is completely external to the display or the mechanism can be partially internal to the display.

To describe these two embodiments, refer now to the following description in conjunction with the accompanying figures.

First Embodiment

In a first embodiment of the present invention, an external hinge mechanism is provided which allows for a pivoting joint for a display utilizing either a VESA compliant mount or non-VESA compliant mount or stand. The hinge mechanism utilizes a combination of tension springs and friction hinges for counterbalancing the weight of the display. To describe the features of the present invention in more detail, refer now to the following description in conjunction with the accompanying figures.

Figure 4:
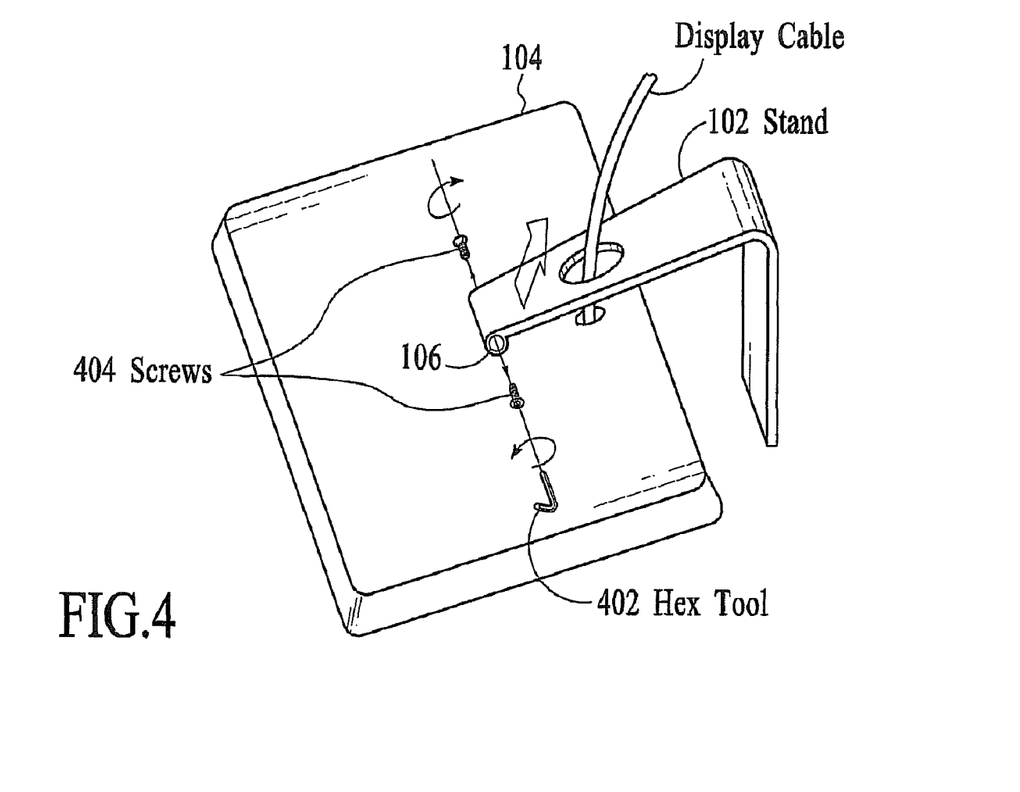
FIG. 4 illustrates the back of a display when removing the stand in accordance with the present invention.

FIG. 4 illustrates the back of a display 104 when removing the stand 102 in accordance with the present invention. Referring now to FIG. 4, a hex tool 402 is utilized to loosen and remove the screws 404 from the hinge assembly 106 that attach the stand 102 to the back of the display 104.

Figure 4A:
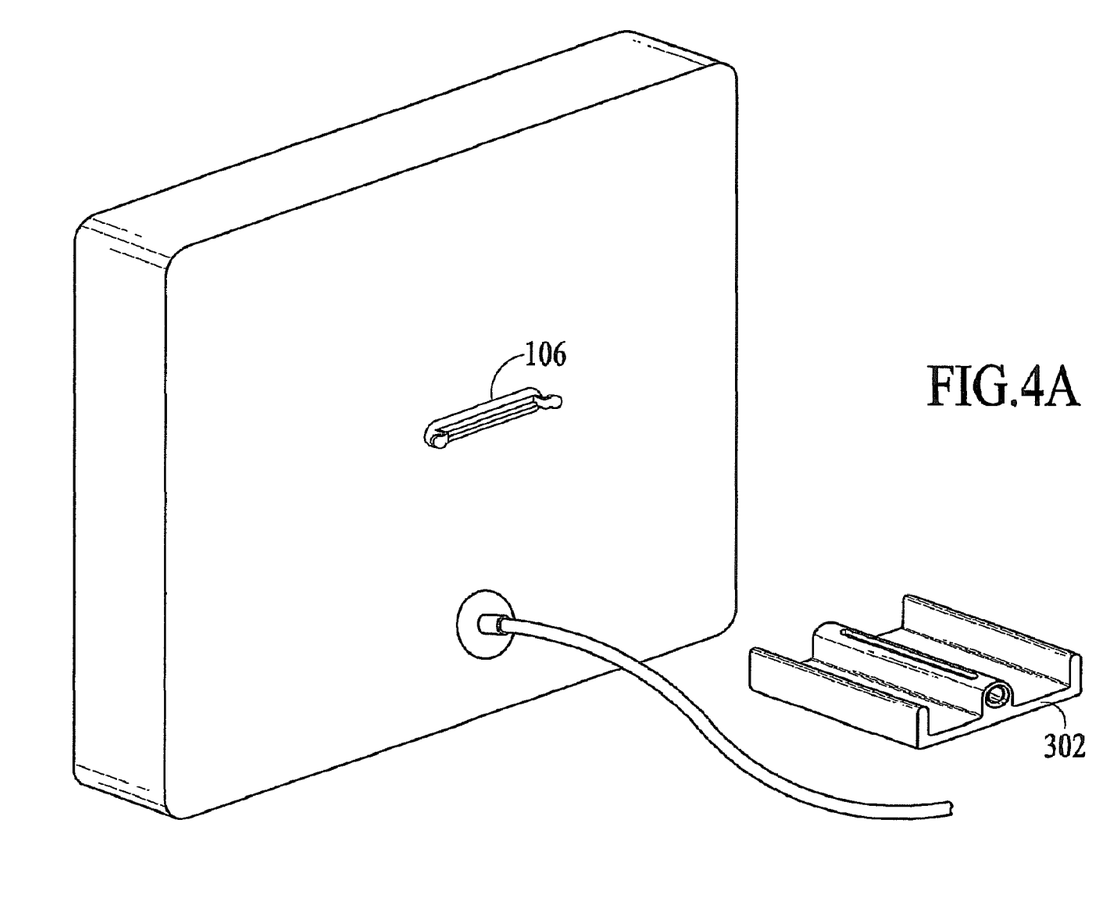
FIG. 4A shows the back of the panel display to illustrate the external hinge mechanism.

FIG. 4A shows the back of the panel display to illustrate the external hinge mechanism 106. The VESA-compliant mount adapter 302 is also shown.

Figure 5:
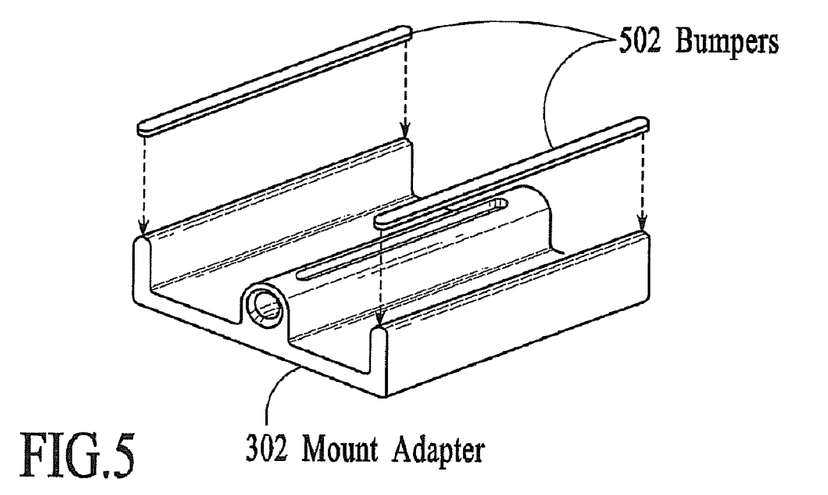
FIG. 5 shows snapping the bumpers into place on each side of the VESA-compliant mount adapter.

FIG. 5 shows snapping the bumpers 502 into place on each side of the VESA-compliant mount adapter 302. After removing the stand 102 the VESA-compliant mount adapter 302 can be attached to the display 102 in the following manner. Screws and bumpers 502 are obtained for the appropriate style of display. The bumpers 502 can be snapped into place on each side of a VESA-compliant mount adapter 302.

Figure 6:
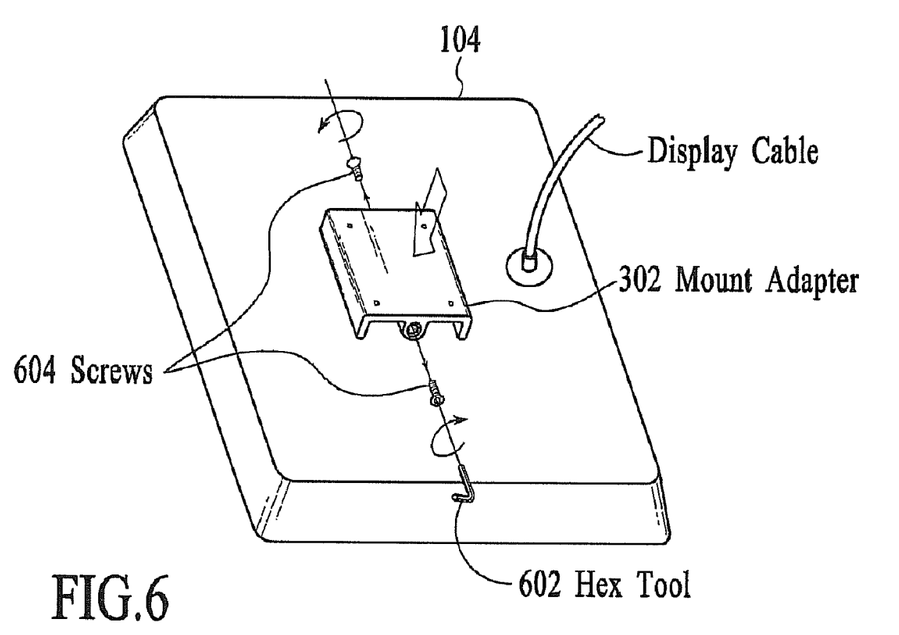
FIG. 6 shows the VESA-compliant mount adapter being attached to the hinge mechanism in accordance with the first embodiment of the present invention.

FIG. 6 shows the VESA-compliant mount adapter 302 being attached to the hinge mechanism 103 in accordance with the first embodiment of the present invention. The mount adapter 302 is placed over the hinge mechanism 103 on the back of the display 104. The hex tool 602 is utilized to screw the mount adapter 302 to the display 104.

Accordingly, in the embodiment shown in FIGS. 4-6 the attachment hinge mechanism 103 is external to the display.

Second Embodiment

In a second embodiment of the present invention, a hinge mechanism which is partially internal and partially external to the display is provided which allows for a pivoting joint for a display. The second embodiment comprises a metal shield, plastic back cover and a hinge mechanism, all of which form part of the integrated computer display. In this type of display the processing system electronics are inside the display.

Figure 7:
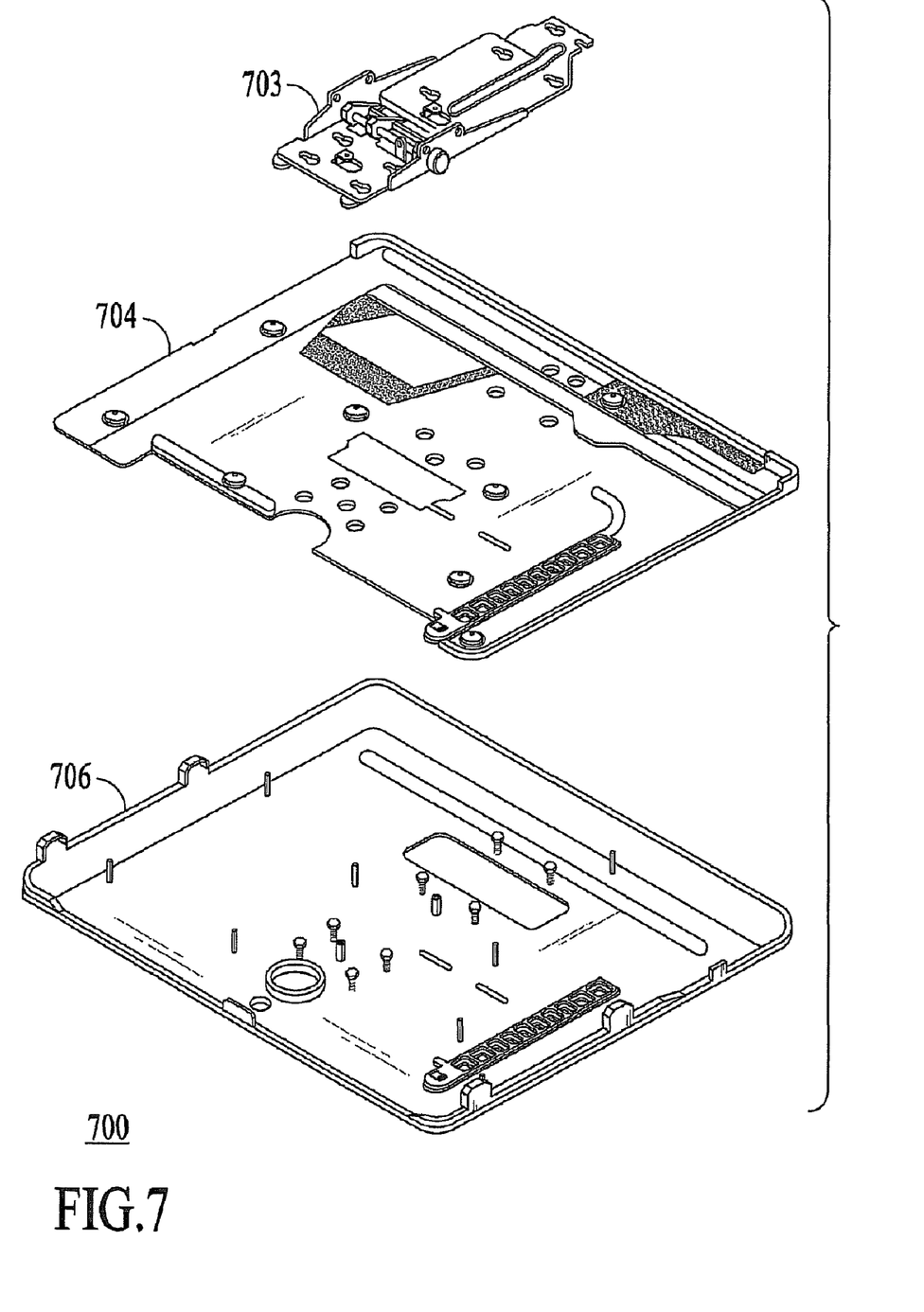
FIG. 7 shows an exploded view of the display assembly.
Figure 8:
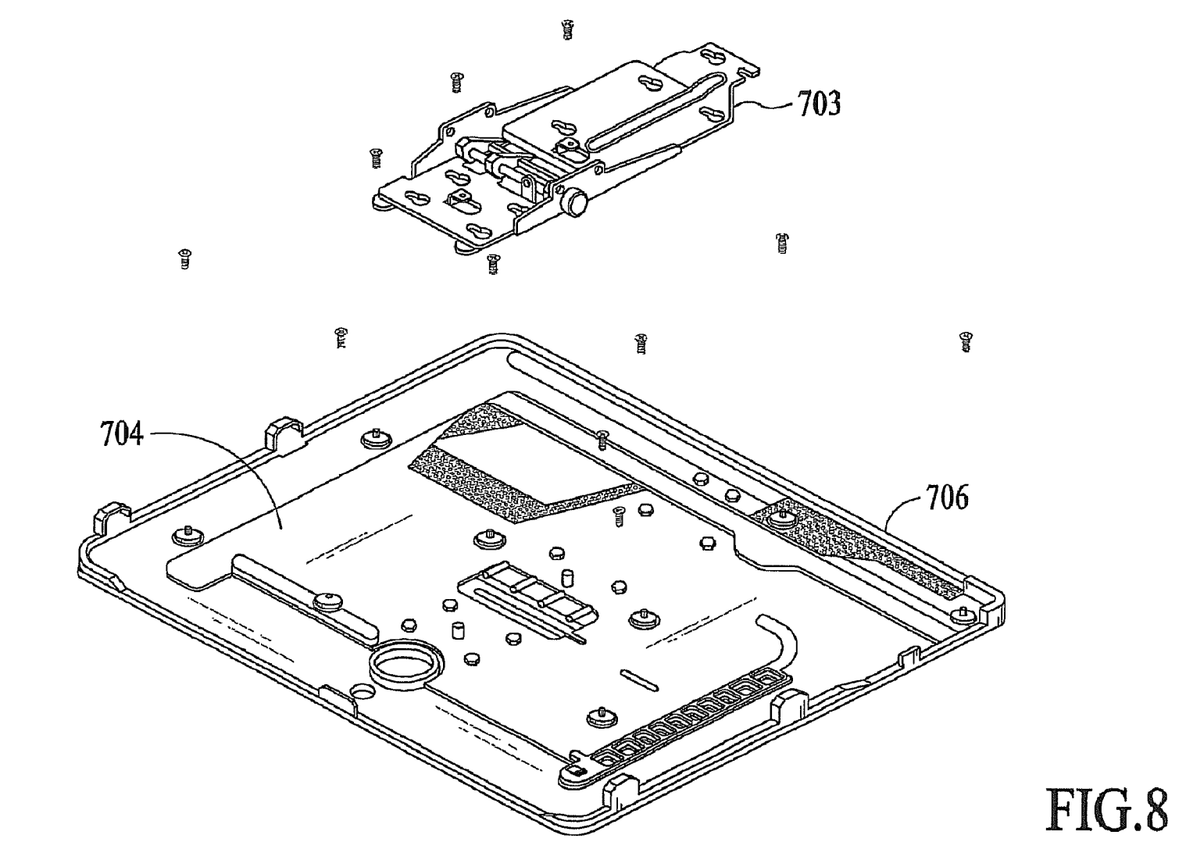
FIG. 8 shows the front cover and the metal shield attached together to form a single unit before the hinge mechanism is put in place.

FIG. 7 shows an exploded view of the display assembly 700. As is seen the display assembly 700 includes a hinge mechanism 703, a metal shield 704 and a front cover 706. FIG. 8 shows the front cover 706 and the metal shield 704 attached together to form a single unit before the hinge mechanism 703 is put in place.

Figure 9:
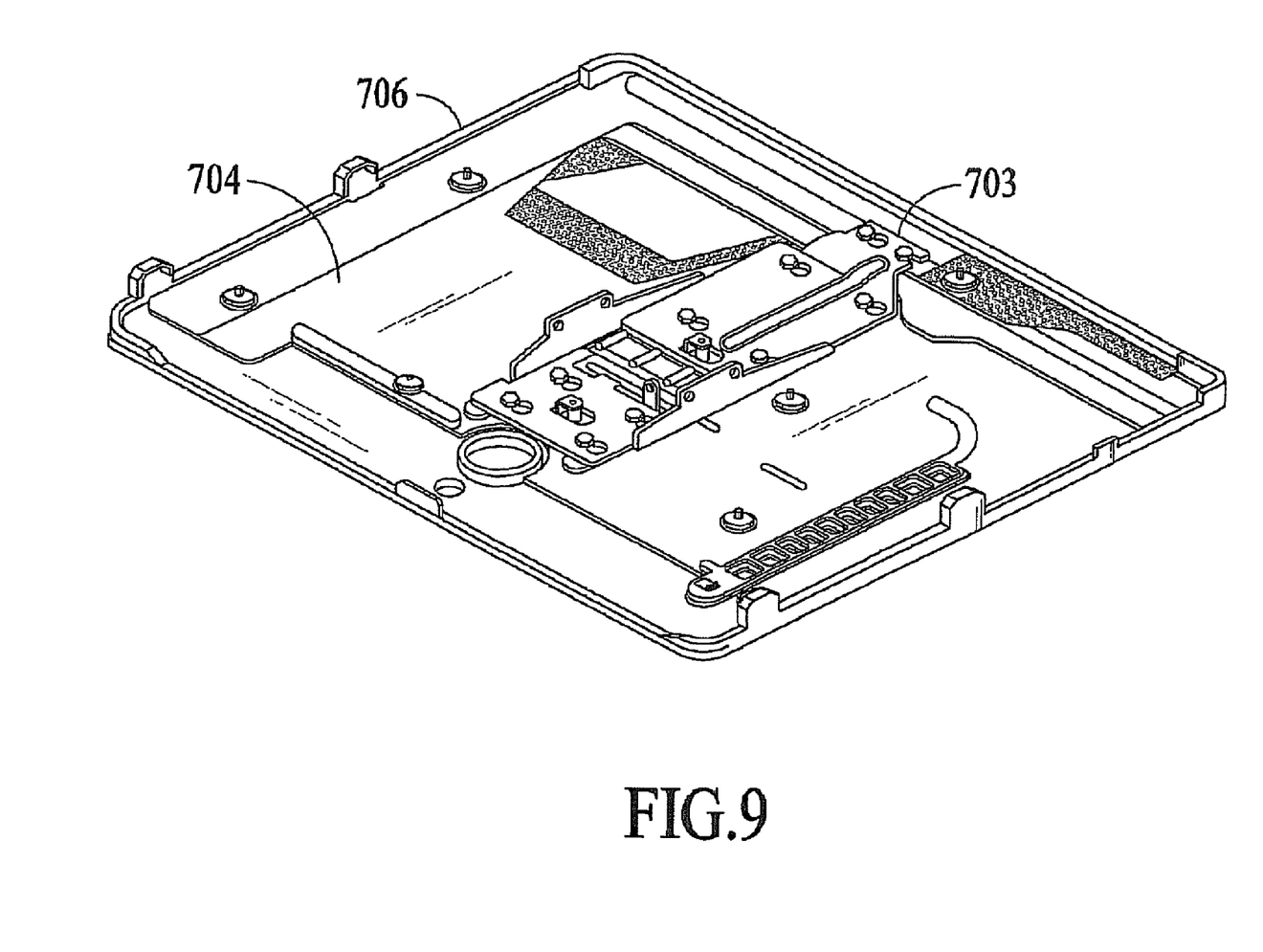
FIG. 9 shows the attached front cover and the metal shield attached to the hinge mechanism.

FIG. 9 shows the attached together front cover 706 and the metal shield 704 attached to the hinge mechanism 703.

Figure 10:
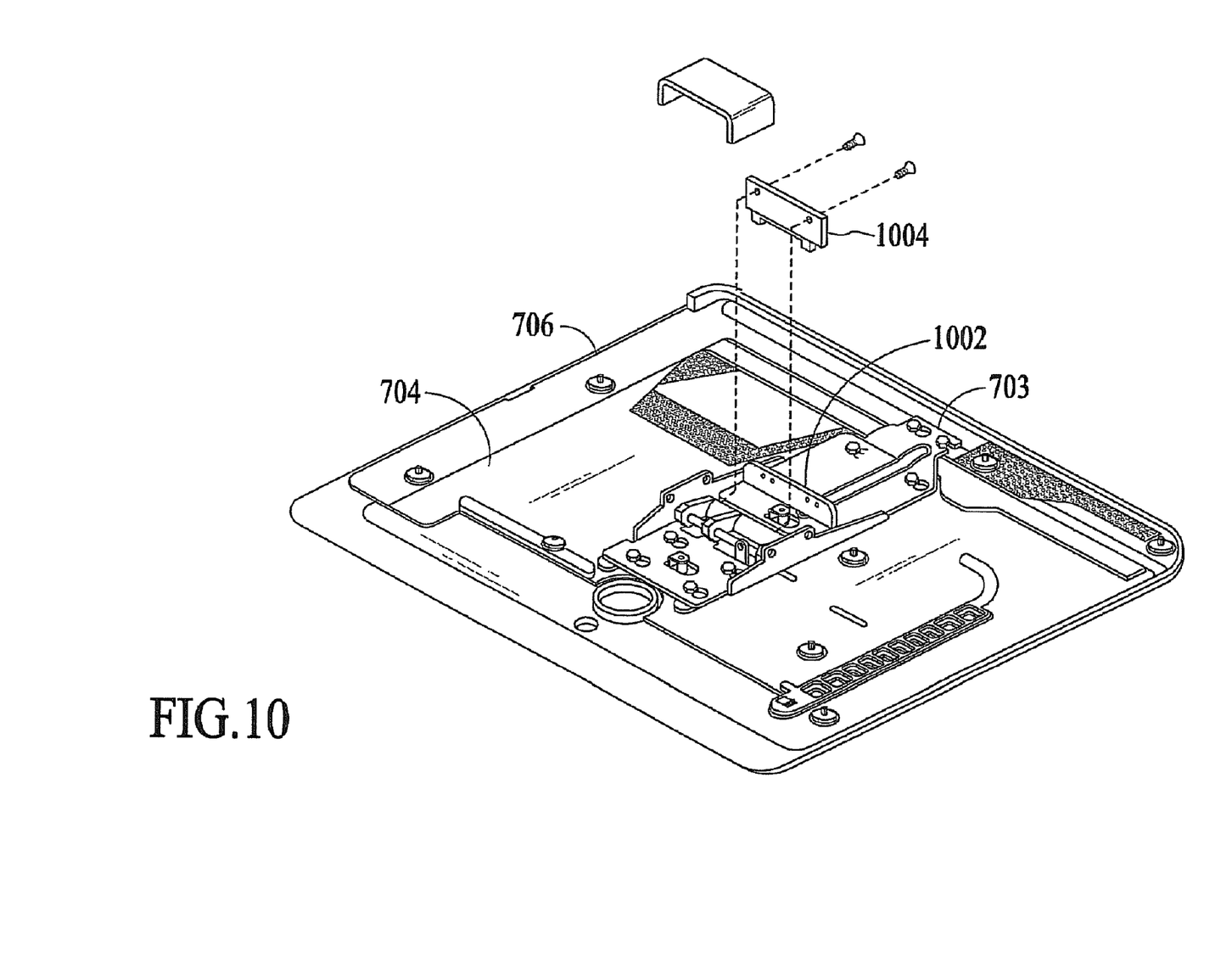
FIG. 10 is an exploded view which shows the metal shield and the front cover coupled to each other.

FIG. 10 is an exploded view which shows metal shield 704 and the front cover 706 coupled to each other. The hinge mechanism 703 is positioned on the metal shield 704. The external portion 1004 of the hinge mechanism 703 which is attached to the VESA-compliant mount adapter (not shown) is shown exploded away from the hinge mechanism 703. In the front of this assembly would be located the electronic components (not shown) and the display (not shown).

Figure 11:
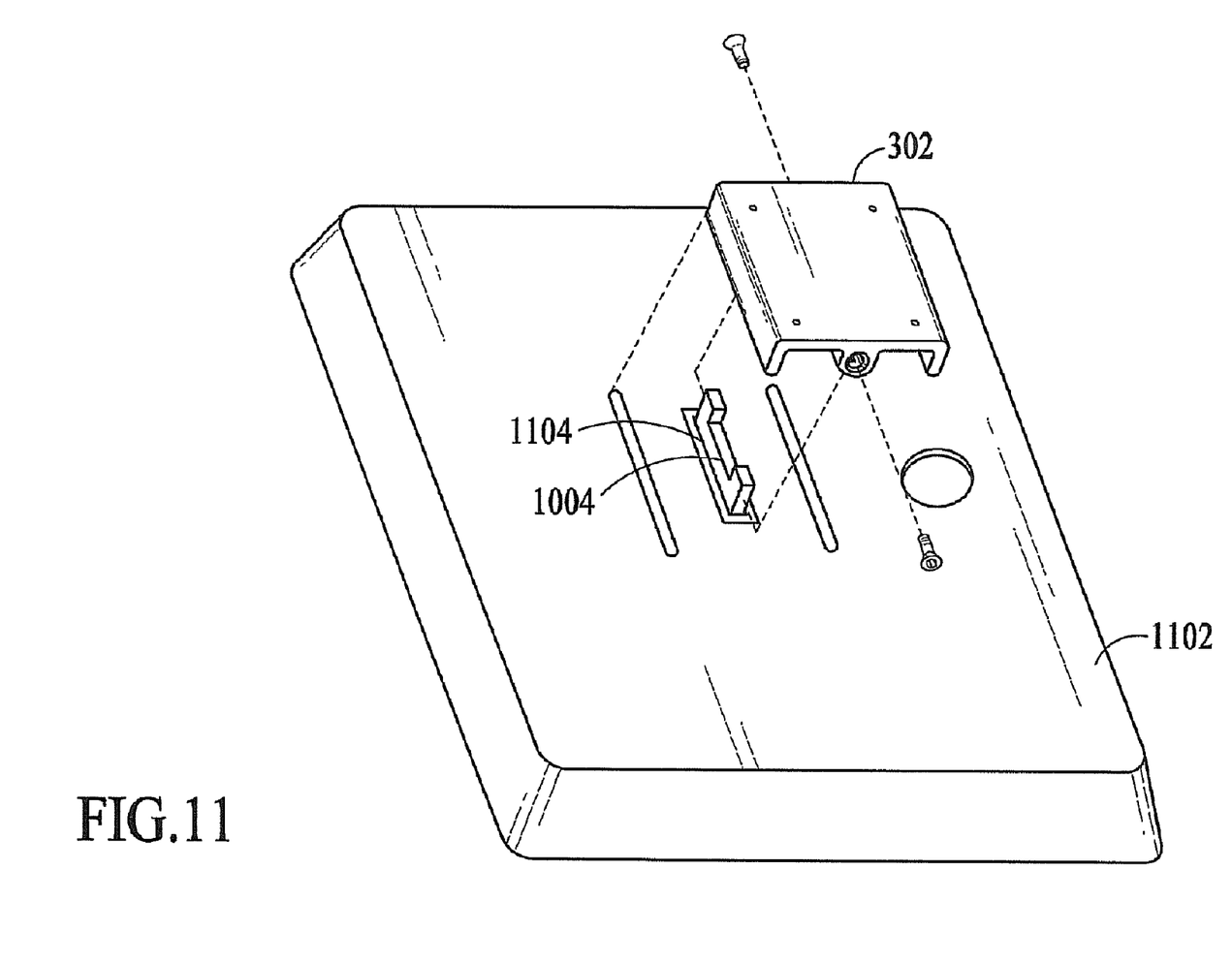
FIG. 11 shows an assembled display which includes a back cover.

FIG. 11 shows an assembled display which includes a back cover 1102. As is seen, the external portion 1004 protrudes from a slot 1104 in the back cover 1102. The VESA-compliant mount 302 is shown separately. The removal and attachment of the mount whether VESA-compliant or non-standard could be accomplished by utilizing the two screws as described in FIGS. 4-6.

Accordingly, in the second embodiment shown in FIGS. 7-11 the resulting display would look like that shown in FIG. 1-3. In this second embodiment the hinge mechanism 703 is partially internal to the display assembly.

A system and method in accordance with the present invention allows for the replacement of a non-VESA standard compatible display mount with a display mount that is compatible with the VESA standard. Utilizing the system and method in accordance with the present invention, such a replacement can be accomplished with minimal effort, and in an efficient manner.

Although the present invention has been described in accordance with the embodiments shown, one of ordinary skill in the art will readily recognize that there could be variations to the embodiments and those variations would be within the spirit and scope of the present invention. Although the metal shield is depicted with a specific design and shape, one of ordinary skill in the art will readily recognize that the metal shield can be of a different design and shape and those variations would be within the spirit and scope of the present invention. In addition, although the flat panel display assembly is disclosed in the context of a VESA standard, one of ordinary skill in the art recognizes that the assembly could be any industry standard assembly and its use would be within the spirit and scope of the present invention. Finally, the front and back covers of the assembly could be made of a variety of materials and their use would be within the spirit and scope of the present invention. Accordingly, many modifications may be made by one of ordinary skill in the art without departing from the spirit and scope of the appended claims.

What is claimed is:

1. An apparatus, comprising:
   a flat panel assembly;
   a hinge mechanism coupled to the flat panel assembly, the hinge mechanism configured for attachment to a mount that is non-VESA (Video Electronics Standards Association) -compliant, wherein a first portion of the hinge mechanism is internal to the flat panel assembly and a second portion of the hinge mechanism is external to the flat panel assembly; and
   a mount adapter having a first interface coupled to the hinge mechanism, the mount adapter having a second interface rigidly coupled to the first interface and configured for attachment to a mount that is VESA-compliant.

2. The apparatus of claim 1, wherein the hinge mechanism includes a same fastening mechanism for removing and attaching both the mount adapter and the non-VESA compliant mount onto the hinge mechanism.

3. The apparatus of claim 2, wherein the fastening mechanism consists of two screws.

4. The apparatus of claim 1, wherein the flat panel assembly comprises:
   a metal shield for protecting electrical components within the flat panel assembly;
   a front cover coupled to the metal shield and to the hinge mechanism; and
   a back cover over the front cover and the metal shield,
   wherein the back cover includes a slot for allowing the second portion of the hinge mechanism to protrude through the slot.

5. The apparatus of claim 1, wherein the second portion of the hinge mechanism comprises an attachment portion to which both the mount adapter and the non-VESA compliant mount are attachable.

6. The apparatus of claim 5, wherein the hinge mechanism includes a same fastening mechanism for removing and attaching both the mount adapter and the non-VESA compliant mount onto the attachment portion of the hinge mechanism.

7. The apparatus of claim 1, wherein the apparatus comprises a display for a computer system.

8. The apparatus of claim 1, further comprising a bumper having a pre-determined size that is attachable to the mount adapter, the bumper to stabilize the VESA compliant mount against the flat panel assembly.

9. A method, comprising:
providing a flat panel assembly;
coupling a hinge mechanism to the flat panel assembly, the hinge mechanism configured for attachment to a mount that is non-VESA (Video Electronics Standards Association) -compliant, wherein a first portion of the hinge mechanism is internal to the flat panel assembly and a second portion of the hinge mechanism is external to the flat panel assembly; and
coupling a mount adapter having a first interface to the hinge mechanism, the mount adapter having a second interface rigidly coupled to the first interface and configured for attachment to a mount that is VESA-compliant.

10. The method of claim 9, wherein the hinge mechanism includes a same fastening mechanism for removing and attaching both the mount adapter and the non-VESA compliant mount onto the hinge mechanism.

11. The method of claim 10, wherein the fastening mechanism consists of two screws.

12. The method of claim 9, wherein the flat panel assembly comprises:
a metal shield for protecting electrical components within the flat panel assembly;
a front cover coupled to the metal shield and to the hinge mechanism; and
a back cover over the front cover and the metal shield,
wherein the back cover includes a slot for allowing the second portion of the hinge mechanism to protrude through the slot.

13. The method of claim 9, wherein the second portion of the hinge mechanism comprises an attachment portion to which both the mount adapter and the non-VESA compliant mount are attachable.

14. The method of claim 13, wherein the hinge mechanism includes a same fastening mechanism for removing and attaching both the mount adapter and the non-VESA compliant mount onto the attachment portion of the hinge mechanism.

15. The method of claim 9, wherein the apparatus comprises a display for a computer system.

16. The method of claim 9, further comprising a bumper having a pre-determined size that is attachable to the mount adapter, the bumper to stabilize the VESA compliant mount against the flat panel assembly.

\* \* \* \* \*